US008237953B2

(12) United States Patent
Watanabe

(10) Patent No.: US 8,237,953 B2
(45) Date of Patent: Aug. 7, 2012

(54) DIGITAL CAMERA AND CONTROL METHOD OF DIGITAL CAMERA

(75) Inventor: Hitoshi Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1204 days.

(21) Appl. No.: 11/242,260

(22) Filed: Oct. 3, 2005

(65) Prior Publication Data

US 2006/0077455 A1    Apr. 13, 2006

(30) Foreign Application Priority Data

Oct. 8, 2004    (JP) ................... 2004-295827

(51) Int. Cl.
*G06F 3/12* (2006.01)

(52) U.S. Cl. ...... 358/1.15; 358/1.13; 358/402; 455/500; 455/88; 455/518; 455/557

(58) Field of Classification Search ................. 358/1.13, 358/1.15, 402; 235/462.01; 709/220, 238, 709/227; 455/41.1, 500, 88, 518, 557; 348/211.4, 348/333.02, 207.2; 713/300, 168; 710/16
See application file for complete search history.

(56) References Cited

U.S. PATENT DOCUMENTS

| | | | | |
|---|---|---|---|---|
| 6,710,892 B2* | 3/2004 | Narushima | ................... | 358/1.13 |
| 6,782,241 B2* | 8/2004 | Kobayashi | ...................... | 455/88 |
| 6,934,532 B2* | 8/2005 | Coppinger et al. | ........ | 455/412.1 |
| 7,058,419 B2* | 6/2006 | Kotzin et al. | ................. | 455/518 |
| 7,272,407 B2* | 9/2007 | Strittmatter et al. | .......... | 455/500 |
| 7,382,405 B2* | 6/2008 | Kusaka et al. | ............. | 348/231.6 |
| 7,455,229 B2* | 11/2008 | Tanaka | ..................... | 235/462.01 |
| 7,479,984 B2* | 1/2009 | Tanaka et al. | .............. | 348/207.2 |
| 7,542,720 B2* | 6/2009 | Yoda et al. | .................... | 455/41.1 |
| 7,545,784 B2* | 6/2009 | Mgrdechian et al. | ......... | 370/338 |
| 7,557,827 B2* | 7/2009 | Ishiyama et al. | ............ | 348/207.2 |
| 7,576,779 B2* | 8/2009 | Tanaka et al. | .............. | 348/211.4 |
| 7,634,670 B2* | 12/2009 | Nago et al. | .................... | 713/300 |
| 7,652,709 B2* | 1/2010 | Kanda et al. | ............. | 348/333.02 |
| 7,747,775 B2* | 6/2010 | Van Datta | ..................... | 709/238 |
| 7,801,097 B2* | 9/2010 | Bahr et al. | ..................... | 370/338 |
| 2003/0093675 A1* | 5/2003 | Hibino et al. | ................. | 713/168 |
| 2004/0041913 A1* | 3/2004 | Takasumi et al. | .......... | 348/207.2 |
| 2005/0007617 A1* | 1/2005 | Tanaka et al. | ................ | 358/1.13 |
| 2006/0077455 A1* | 4/2006 | Watanabe | .................... | 358/1.15 |
| 2006/0200564 A1* | 9/2006 | Watanabe et al. | ............. | 709/227 |
| 2006/0206592 A1* | 9/2006 | Fujii et al. | ..................... | 709/220 |
| 2006/0212610 A1* | 9/2006 | Nago et al. | ..................... | 710/16 |
| 2006/0246947 A1* | 11/2006 | Fujii et al. | ..................... | 455/557 |
| 2007/0030516 A1* | 2/2007 | Tsuji et al. | .................... | 358/1.15 |

FOREIGN PATENT DOCUMENTS

JP    2001-290619    10/2001

* cited by examiner

*Primary Examiner* — Benny Q Tieu
*Assistant Examiner* — Ashish K Thomas
(74) *Attorney, Agent, or Firm* — Canon USA Inc IP Division

(57) ABSTRACT

To reduce trouble of specifying a target equipment, a nickname, an image, and the like are transmitted from a digital camera to a printer by wire connection not through a LAN. After the digital camera is connected to the printer through the LAN, the digital camera displays information regarding the printer on a monitor based on the nickname, the image, and the like received from the printer.

1 Claim, 10 Drawing Sheets

FIG.4

SEARCH RESPONSE

| UUID | 0x12345678 | ~401 |
|---|---|---|
| DEVICE TYPE | Printer | ~402 |
| SERVICE TYPE | PictBridge | ~403 |
| SERVICE TYPE | Lips VII | ~404 |
| MODEL NAME | XXXCP-10 | ~405 |
| NICKNAME | NEAR A SOUTH SIDE WINDOW | ~406 |
| THUMBNAIL IMAGE | IMAGE DATA | ~407 |

FIG.5

| SEARCH RESULT | | |
|---|---|---|
| XXXXCP-10 | SELECT | DETAIL |
| XXXXCP-100 | SELECT | DETAIL |
| 🧺 NEAR A SOUTH SIDE WINDOW | SELECT | DETAIL |
| XXXXCP-300 | SELECT | DETAIL |
| XXXXCP-200 | SELECT | DETAIL |

FIG.8A

SEARCH REQUEST

*801

| SEARCH TYPE | All |
|---|---|
| Parameter | None |

*802

| SEARCH TYPE | UUID |
|---|---|
| Parameter | 0x12345678 |

*803

| SEARCH TYPE | DEVICE TYPE |
|---|---|
| Parameter | Printer |

*804

| SEARCH TYPE | SERVICE TYPE |
|---|---|
| Parameter | PictBridge |

*805

| SEARCH TYPE | MODEL NAME |
|---|---|
| Parameter | XXXXCP-10 |

FIG.8B

SEARCH RESPONSE

*806

| UUID | 0x12345678 |
|---|---|
| DEVICE TYPE | Printer |
| SERVICE TYPE | PictBridge |
| SERVICE TYPE | Lips VII |

| UUID | 0x12345678 | 901 |
|---|---|---|
| DEVICE TYPE | Printer | |
| SERVICE TYPE | PictBridge | |
| SERVICE TYPE | Lips Ⅶ | |
| MODEL NAME | XXXXCP-10 | |
| UUID | 0x87654321 | |
| DEVICE TYPE | Printer | |
| SERVICE TYPE | PictBridge | |
| MODEL NAME | XXXXCP-100 | |

DIGITAL CAMERA AND CONTROL METHOD OF DIGITAL CAMERA

BACKGROUND OF THE INVENTION

1. Field of the Invention

The present invention relates to a digital camera capable of a network connection and a control method for a digital camera.

2. Description of the Related Art

In recent years, a system has been proposed which connects an image capture apparatus, such as a digital camera, to a Local Area Network (hereinafter referred to as LAN) and prints out the image on a printer connected to the LAN. On the other hand, in the case where network equipment, such as a personal computer, is connected to the LAN and an output is made to a specific printer and the like connected to the LAN, it is necessary to specify the equipment of an output destination. Therefore, a list of information on the equipment connected to the LAN has to be obtained to select a target equipment from the list of the connected equipment, or after checking the equipment specific ID of the target equipment in advance, the ID of the target equipment is directly inputted in an output device, so as to select the target equipment. Japanese Patent Application Laid-Open No. 2001-290619 discloses the system capable of transmitting and outputting image data from an image input terminal to a print terminal through the network.

However, in a case of a large scale LAN, a great number of equipment are connected thereto, and it can be difficult to determine the equipment to be connected from among those equipment. Besides, when the equipment specific ID of the target equipment is directly inputted, a method of searching for the equipment specific ID is hard to understand for a user. Even when the method of searching for the specific ID is understood, in the case of the digital camera and the like, it is difficult to input a character string, and the inputting of the ID itself causes a lot of trouble.

SUMMARY OF THE INVENTION

The present invention is directed to a digital camera and a control method thereof.

In one aspect of the present invention, a digital camera connectable to a predetermined network is provided. The digital camera includes a communication unit configured to transmit identification information to a printer not through the predetermined network, and a display unit configured to display information regarding the printer based on the identification information received from the printer after the digital camera is connected to the printer through the predetermined network.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an example of a search response returned by the equipment connected to the LAN.

FIG. 5 shows an example in which the digital camera connected to the LAN shows a list of equipment connected to the LAN.

FIGS. 8A and 8B show examples of a search request issued by the digital camera connected to the LAN and the search response returned by the equipment connected to the LAN.

DETAILED DESCRIPTION OF THE EMBODIMENTS

Embodiments of the invention will be described in detail below with reference to the drawings.

First Embodiment

Figure 1:
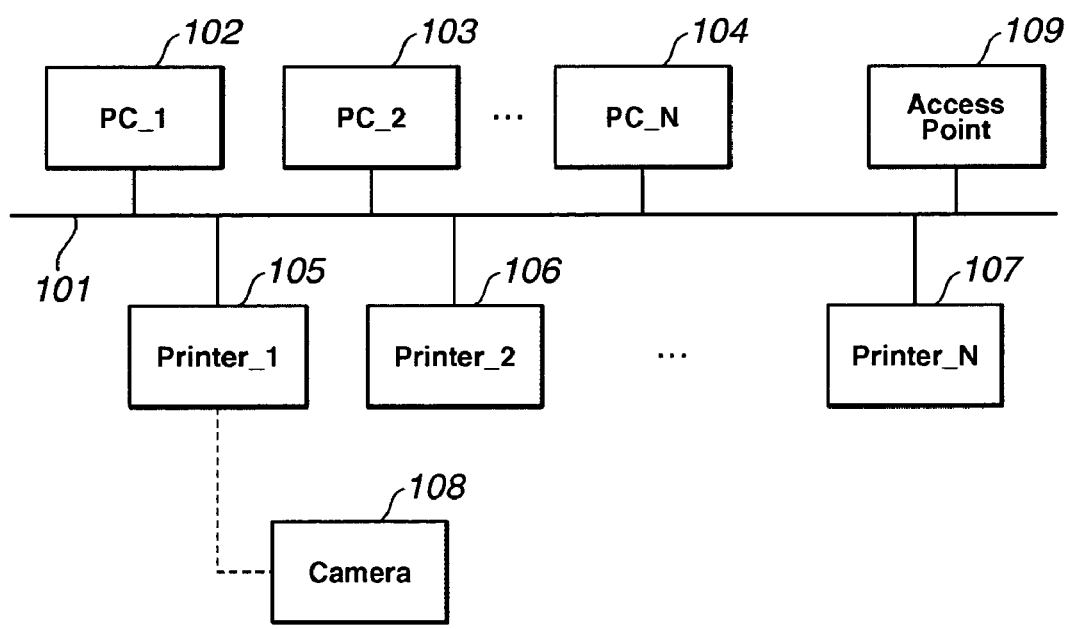
FIG. 1 is a network block diagram showing a digital camera connected to a LAN.

FIG. 1 is a connection diagram in which network equipment is connected to the LAN and a digital camera is about to be connected to the LAN. A network 101 is connected to the arbitrary number of PCs 102 to 104, the arbitrary number of printers 105 to 107, and a wireless LAN access point 109. These devices are mutually connected already through the network 101.

In this state, a digital camera 108 is allowed to newly participate in the LAN by wireless through the access point 109, and an image held by the digital camera 108 is outputted to a Printer_1 105 using the LAN.

In order to allow the digital camera 108 to participate in the LAN in FIG. 1, a command requesting participation in the LAN is transmitted from the digital camera 108 to the access point 109. After going through a certification process depending on the setting of the LAN, the digital camera 108 is connected to the LAN. However, in the present embodiment, before the command requesting participation in the LAN is transmitted from the digital camera 108 to the access point 109, the Printer_1 (105) and the digital camera 108 are connected by wire through a USB. At this time, the digital camera 108 transmits a printer nickname and a thumbnail image to the Printer_1 (105). After that, when wirelessly connected to the LAN, the camera 108 receives that information from the printer, thereby making it easy to find out the target printer_1 (105) from among other LAN connected equipment.

Figure 11:
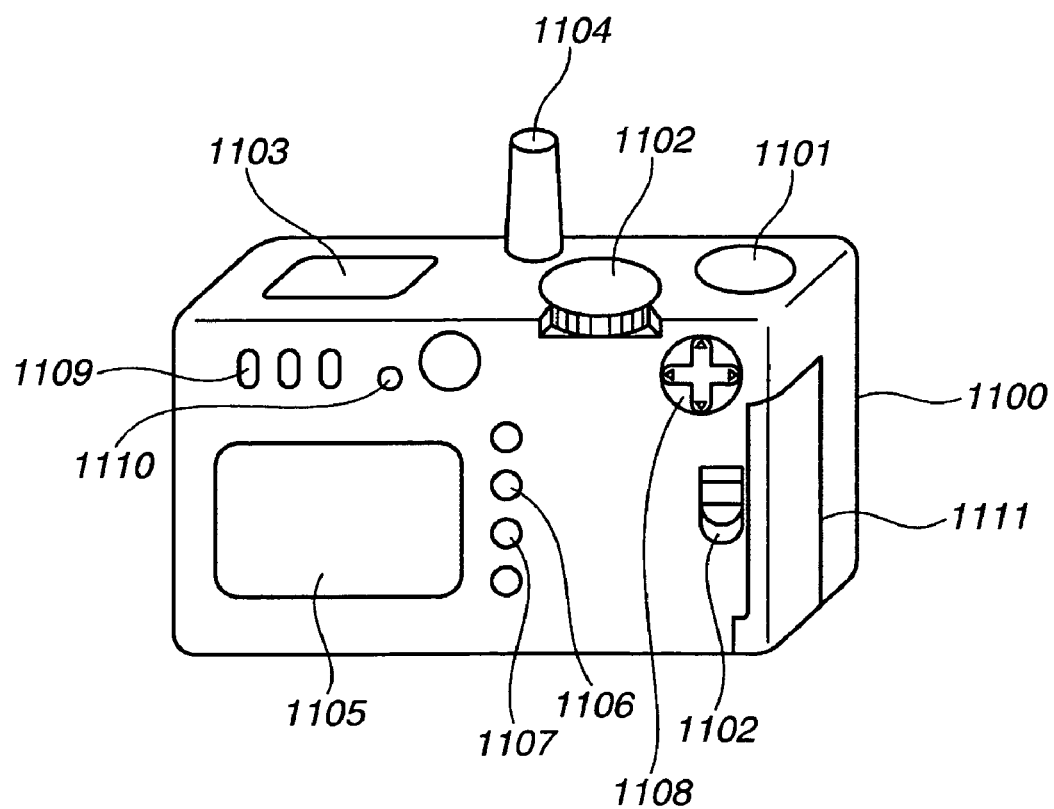
FIG. 11 is a perspective view showing the outer appearance of the rear surface side of an electronic camera apparatus according to the embodiment of the present invention.

FIG. 11 is a perspective view showing the outer appearance of the rear surface side of an electronic camera apparatus according to the first embodiment of the present invention.

Referring to FIG. 11, a digital camera 1100 has a lens (not shown) on its front surface. The digital camera 1100 has, on its upper surface, a shutter button 1100 for giving an instruction to take a picture, a mode selection dial 1102 for setting an operation mode of the digital camera 1100, and a compact liquid crystal display device 1103 for displaying the operation state or the like of the digital camera 1100 in characters and pictographs. An antenna 1104 for radio communication is also mounted on the upper surface.

The digital camera 1100 has, on its rear surface, a color liquid crystal display device 1105 for displaying an object image to be photographed or an image recorded on a memory card in the playback mode, a menu button 1106 for invoking menu items for setting various operation conditions for the digital camera 1100, a determination button 1107 for designating an item selected from the menu items, a cross cursor button 1108 for giving an instruction to select a menu item or change an operation state, and other operation buttons for designating the operation state of the digital camera 1100. In addition, the digital camera 1100 has a printing button 1109 for giving an instruction to transmit image data to a printer by radio communication.

Furthermore, the digital camera 1100 has, on its rear surface, an LED lamp 1110 for displaying the operation state of the digital camera 1100 or providing alarm display and a finder for checking an object image.

A memory card cover 1111 is provided on one side surface of the digital camera 1100. The memory card cover 1111 is opened by pressing a memory card cover open lever 1112 on the rear surface of the camera body downward, and a memory card as a storage medium is attached/detached.

An interface connector (not shown) for connecting a cable or the like for communication with other electronic devices is provided on the other side surface of the digital camera 1100. A battery port (not shown) is formed in the lower surface of the digital camera 1100 to allow a battery to be loaded.

Figure 12:
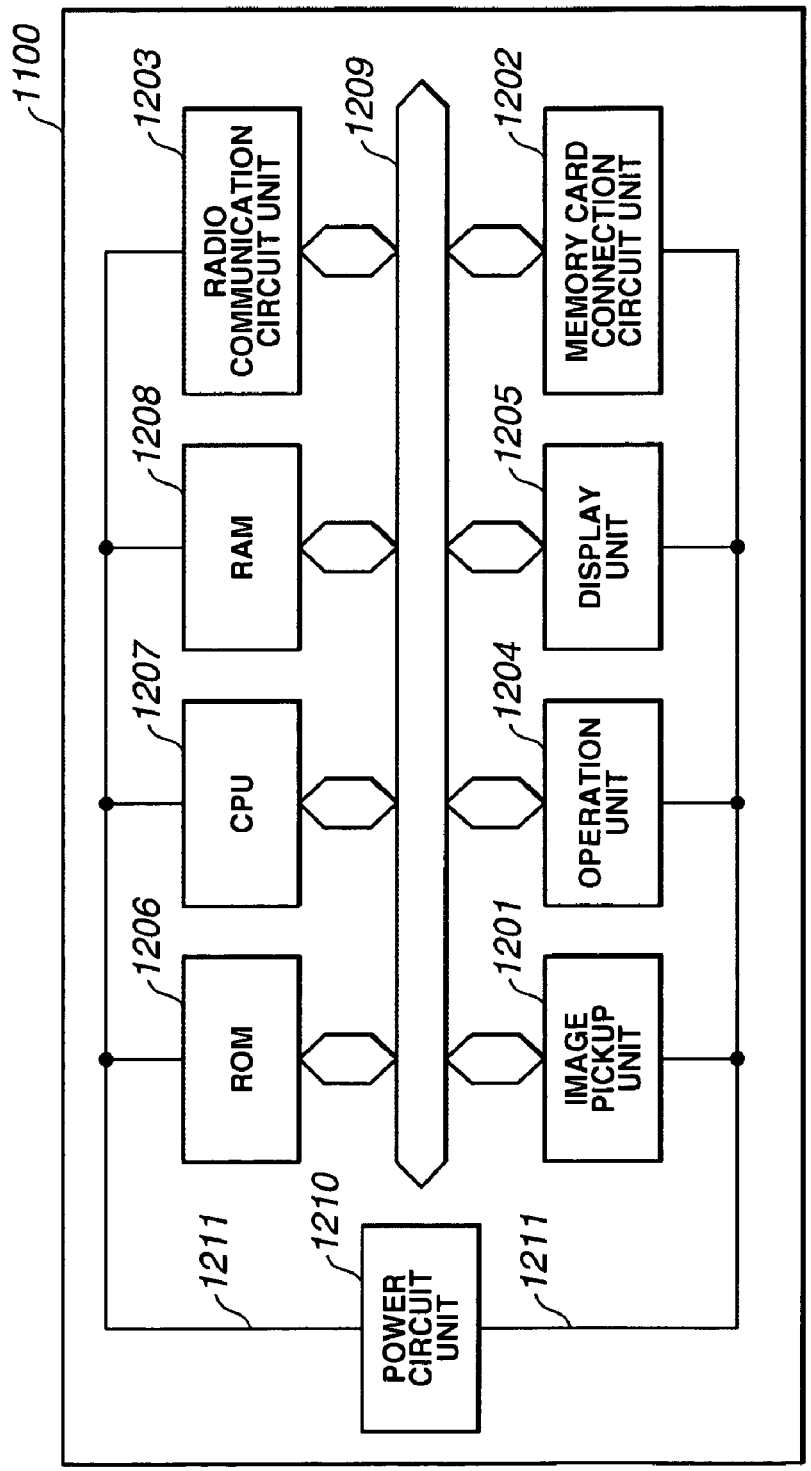
FIG. 12 is a block diagram showing the arrangement of a digital camera 1100 in FIG. 11

FIG. 12 is a block diagram showing the arrangement of the digital camera 1100 in FIG. 11.

The digital camera 1100 includes, as its constituent elements, an image pickup unit 1201, memory card connection circuit unit 1202, radio communication circuit unit 1203, operation unit 1204, display unit 1205, ROM 1206, CPU 1207, and RAM 1208. These elements are connected to each other through a bus line 1209. The digital camera 1100 also has a power circuit unit 1210.

The image pickup unit 1201 is roughly constituted by a lens on which light reflected by an object is incident, a charge-coupled device (CCD) for converting the light image formed by the lens into an electrical signal, an analog/digital converter for converting the analog electrical signal output from the CCD into a digital electrical signal, and the like. The image pickup unit 1201 has the function of outputting the digital image data of the object to the bus line 1209.

The memory card connection circuit unit 1202 is comprised of a memory card connection connector to which a memory card is attached and a memory card control circuit. The digital camera 1100 records image data obtained by photography on the memory card attached to the memory card connection connector.

The radio communication circuit unit 1203 is roughly constituted by an antenna, RF circuit, encoding/decoding circuit, and the like, and has the function of forming a radio network, together with an electronic device and information processing apparatus having equivalent radio communication functions and transmitting and receiving data with each other.

The operation unit 1204 is comprised of switches and the like interlocked with buttons, dials, and the like which are used to operate the digital camera 1100, e.g., the photography button 1101 for giving an instruction to take a picture, the mode selection dial 1102 for selecting an operation mode of the digital camera 1100, and the menu button 1106 for giving an instruction to display a menu window, and has the function of outputting the states of these switched as electrical signals. The operation unit 1204 also has the function of outputting a change in the state of a switch upon operation of a button or dial as a change in electrical signal.

The display unit 1205 is comprised of the compact liquid crystal display device 1103, color liquid crystal display device 1105, LED lamp 1110, and the like. The color liquid crystal display device 1105 has the function of displaying an image as a photography target which is formed on the CCD, and also has the function of playing back and displaying the image data stored in a memory card. In addition, the color liquid crystal display device 1105 has the function of displaying the menu window upon operation of the menu button 1106 or the like. Furthermore, the color liquid crystal display device 1105 has the function of displaying character information or the like to indicate that image data is being transmitted by the radio communication circuit unit 1203.

The LED lamp 1110 displays the operation state of the digital camera and performs alarm display for the user. In this embodiment, while the radio communication circuit unit 1203 is transmitting image data, the LED lamp 1110 blinks to inform the user about the transmission. Further, when the printing button 1109 is pushed to give an instruction to transmit image data, the LED Lamp blinks to warn the user if the image data is not stored on the RAM or a printer does not exist on a radio network.

The ROM 1206 is a nonvolatile memory in which control procedures for the CPU 1207 are stored in advance. The ROM 1206 has the function of outputting stored contents to the bus line 1209 in accordance with a read instruction from the CPU 1207.

The CPU 1207 has the function of controlling the image pickup unit 1201, controlling the memory card connection circuit unit 1202, managing a memory card attached to a memory card connection connector, controlling the radio communication circuit unit 1203, detecting the switch state output from the operation unit 1204, and controlling the display unit 1205 by executing the control procedures stored in the ROM 1206.

The CPU 1207 also has the function of performing control to check upon operation of the printing button 1109 whether a printer exists on a radio network and transmit image data to the printer, if only one printer exists on the network, or to a selected one of printers if a plurality of printers exist on the network.

Although described in detail later, upon detecting a communication failure during transmission of image data due to power-down of an electronic device or disconnection of the communication, the CPU 1207 also performs processing to newly set a transmission destination for the image data so as to retransmit the data.

The RAM 1208 serves as a temporary buffer for the digital image data output from the image pickup unit 1201, a temporary storage for the data to be written on a memory card or the data read out from the memory card, a work memory for the CPU 1207, and the like. The RAM 1208 has a secured area for storing the identification code of a printer as a destination to which data is to be transmitted when the printing button 1109 is pushed to transmit image data.

The power circuit unit 1210 is roughly constituted by a battery, DC/DC converter, and the like, and has the function of supplying power to each constituent element of the digital camera through a power line 1211.

The radio network constituted by the digital camera according to this embodiment and other electronic devices and information processing apparatuses will be described next.

Figure 2:
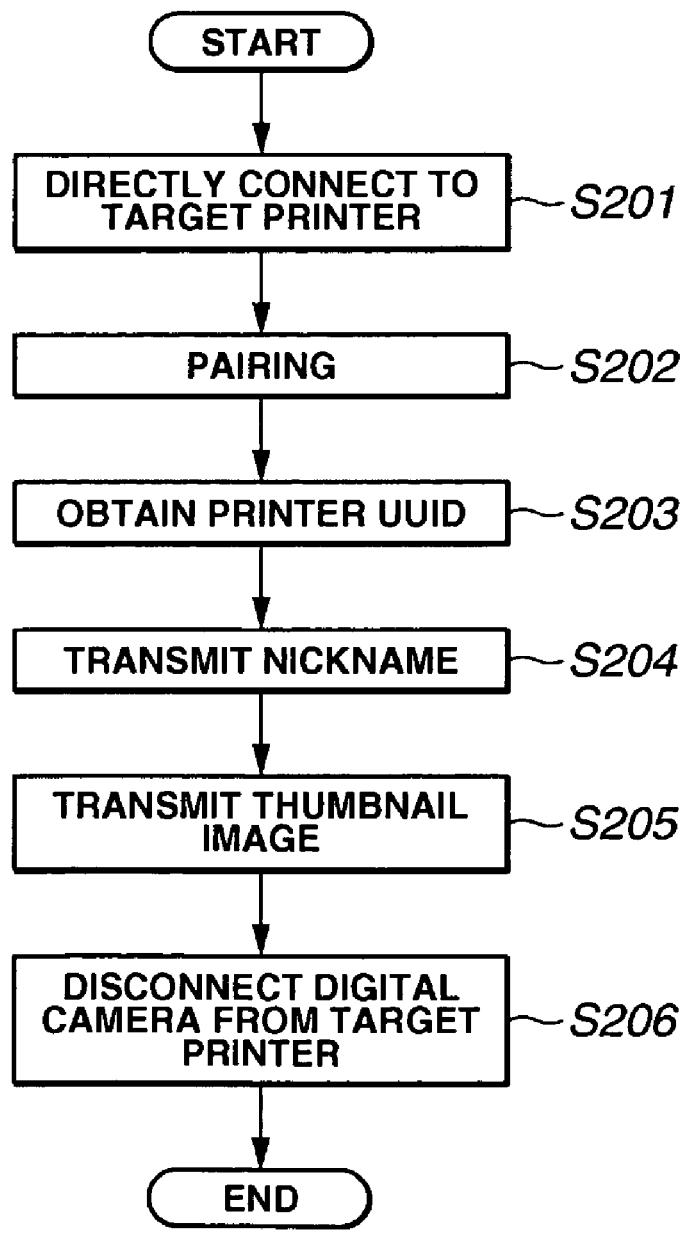
FIG. 2 is a flowchart showing the pairing processing between the digital camera and a target printer.

FIG. 2 is a flowchart showing the processing in the digital camera when the Printer_1 (105) in FIG. 1 is wirelessly connected to the digital camera 108. This processing is controlled and executed by a CPU (not shown) which controls the entire operation of the digital camera.

First, at step S201, a connection is made by wire to a target printer that outputs the image received from the digital camera 108 in FIG. 1. In the present embodiment, the target printer is the Printer_1 (105) in FIG. 1.

When the direct connection is established, at step S202, pairing is started, which is a processing to exchange information with the digital camera with regard to target printer information. The pairing may be automatically started when the camera is connected by wire, or after the camera is connected by wire, by operating the user interface (UI) member of the printer or the digital camera, the pairing may be started. In the present embodiment, the pairing is started by depressing a pairing start button (not shown) of the printer.

At step S203, a universally unique identifier (UUID) of the printer is obtained. The UUID is the equipment specific ID with which an identical ID does not exist among the equipment connected to the LAN. By specifying this ID, the equipment to be connected on the LAN is limited to only one device.

At step S204, the printer nickname is transmitted from the digital camera to the target printer. The printer nickname is an arbitrary character string, and can be freely specified. Although there is no need that the nickname be unique in the LAN, if the same nickname exists in a plurality, confusion occurs. Accordingly, the nickname is unique. Before transmitting the nickname, it is necessary to hold the nickname within the digital camera in advance, which may be inputted into the digital camera using a soft keyboard and the like or the UI member of the digital camera. Alternatively, the nickname may be set in advance by connecting the digital camera to a PC. Further, the model name of the digital camera may be used as a printer nickname for convenience.

The printer having received the nickname from the digital camera holds the nickname in correlation with the connected camera.

At step S205, the thumbnail image is transmitted from the digital camera to the printer. The transmitted thumbnail image is sent later from the printer to the digital camera when the digital camera is connected to the LAN. Since the digital camera displays the image transmitted from the printer in a list of connected equipment, the image can be that of the target printer which can be promptly recognized. For example, if the digital camera captures a photo of the printer itself, and that photo is transmitted to the printer, the photo of that target printer is displayed in the list of LAN connected equipment, and therefore, the target printer can be visually and easily recognized. Naturally, it does not need to be the photo of the printer itself. Instead of the printer image itself, if a characteristic image which is somehow recognizable when displayed in the list is transmitted to the printer, then, the object is achieved.

The image data transmitted to the printer can be an image itself captured by the digital camera. However, if the image is unnecessarily brilliant, it only contributes to increase the communication traffic. Accordingly, in the present embodiment, a reduced thumbnail image of the captured image is transmitted.

The printer having received the thumbnail image from the digital camera holds the thumbnail image together with the nickname in correlation with the connected digital camera.

At step S206, the digital camera and the target printer are disconnected.

Thus, the pairing has been completed, and preparation for the wireless connection to the LAN has been made.

Figure 3:
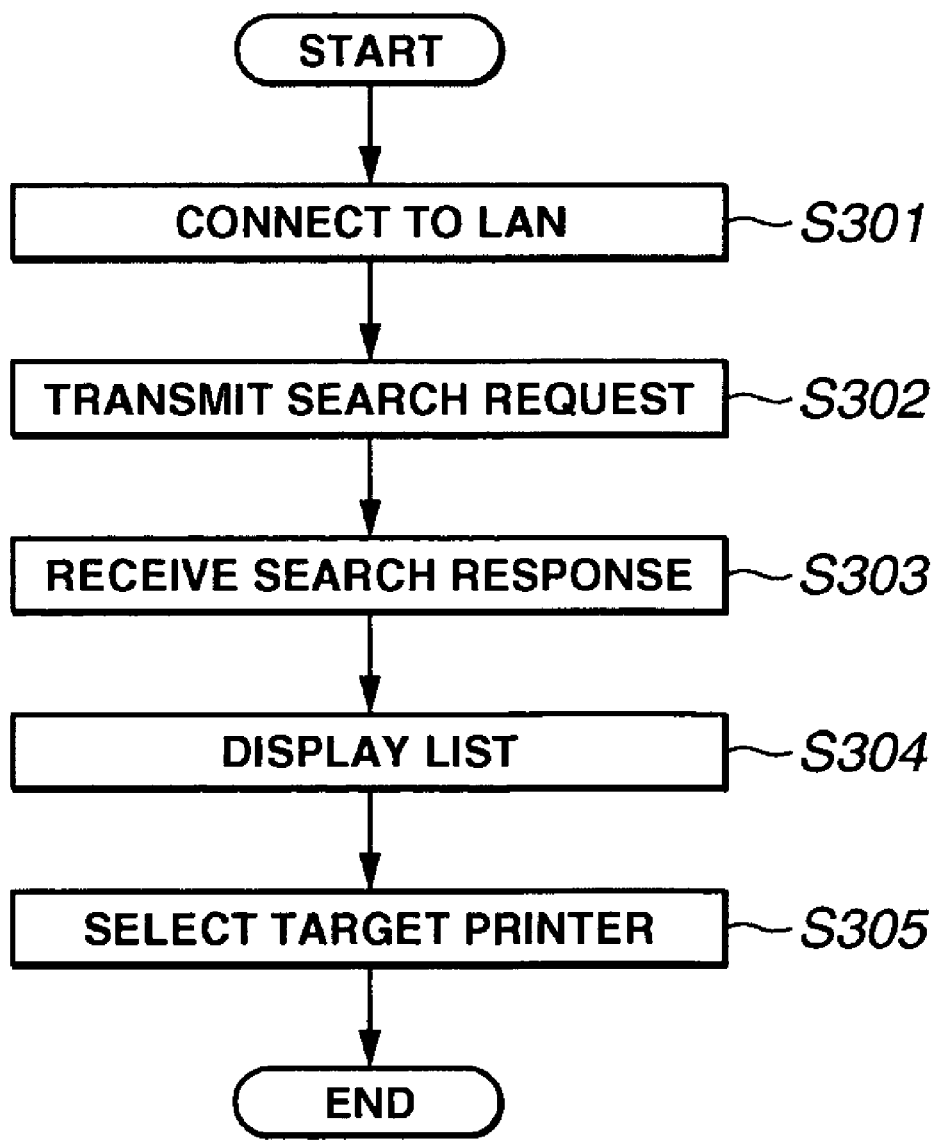
FIG. 3 is a flowchart showing the processing in which the digital camera is connected to the LAN and equipment connected thereto is searched to find a target printer.

FIG. 3 is a flowchart showing processing in the digital camera when the digital camera is connected to the LAN, and image data is specified for the target printer. The processing is controlled and executed by a CPU (not shown) for controlling the entire operation of the digital camera.

At step S301, according to the above described procedure, the digital camera subjected to the pairing processing in advance is wirelessly connected to the LAN through the access point 109 in FIG. 1. There are cases where a certification procedure is required at this point in time depending on a security level of the LAN.

When the connection is completed, at step S302, an equipment discovery process to find out the target printer for outputting an image is executed. For the equipment discovery, a search request is broadcasted to all the equipment connected to the LAN. The equipment having received the search request returns search responses as shown in FIG. 4.

The search responses include information on the equipment which return the responses, and also include a UUID, a device type, a service type, a model name, a nickname, and image data. A device type showing the type of the equipment, such as Printer, and a service type showing the service executable by the equipment can exist in a plurality.

At step S303, the digital camera receives and holds the research responses from all the equipment.

At step S304, the digital camera displays a list of a search result as shown in FIG. 5.

A list display in FIG. 5 is prepared from the search responses in FIG. 4, and displays a nickname 406 as a captioned item name 507. With regard to the equipment to which a nickname is not given, the model name 405 is displayed as a captioned item name 501. Further, with regard to the equipment for which image data 407 exists, its image is displayed together as an item 506.

In the list display, a main selection cursor 502 is moved up and down using upper and lower keys (not shown) of the digital camera, so as to select the target equipment from the list.

A sub cursor 503 moves up and down in association with the main cursor 502, and focuses on a selection 504 or a detail 505 of the list items selected by the main cursor.

The sub cursor 503 is moved left and right using the left and right keys (not shown) of the digital camera. When the detail 505 is brought into focus and a decision key (not shown) of the digital camera is depressed, detailed information on the equipment selected by the main cursor 502 is displayed. The detailed information, as shown in the information equipment data group in FIG. 4, is the UUID, the device type, the service type, the model name, the nickname, and a thumbnail image of the equipment. As further assistance for specifying the target equipment, the detailed information can be displayed in the case where the target equipment is not specified by the model name alone.

At step S305, the main cursor 502 is focused onto the target equipment using the upper and lower keys of the digital camera. While the sub cursor is focused onto the selection 504 using the left and right keys, a decision key is depressed, and the selected equipment is decided as a target printer.

At step S305, when the target printer is decided, the image to be printed by the digital camera is selected, and the print is executed.

As described above, when the digital camera is connected to the LAN, a pairing processing is performed in advance with the target printer so as to give the target printer a nickname and image data. When the nickname and the image data are received after connected to the LAN, the nickname and the image data are displayed in a list of LAN connected equipment, thereby making it easy to select the target equipment.

In the present embodiment, the digital camera is connected to the LAN by wireless LAN through the access point 109 of FIG. 1. However, even when the digital camera is connected to the LAN by the wire instead of the wireless access point, the same effect as the present embodiment can be obtained by connecting the digital camera by wire to the LAN after going through the pairing with the target printer.

Further, information to identify the digital cameral is included in the search request described in the present embodiment, and the printer transmits the nickname and the image held in correlation with the digital camera together with the printer UUID.

In this case, a plurality of digital cameras can be controlled using different images and nicknames, and each of the cameras using the printer can set its nickname and image.

Second Embodiment

A configuration for making connection according to the present embodiment is the same as that described in FIG. 1. Consequently, in order to allow a digital camera 108 to participate in the LAN in FIG. 1, a command requesting participation in the LAN is transmitted from the digital camera 108 to an access point 109. After going through a certification process depending on the setting of the LAN, the digital camera 108 is connected to the LAN. Also in the present embodiment, before transmitting the command requesting participation in the LAN from the digital camera 108 to the access point 109, a Printer_1 (105) and the digital camera are connected by wire through a USB.

Figures 9, 10:
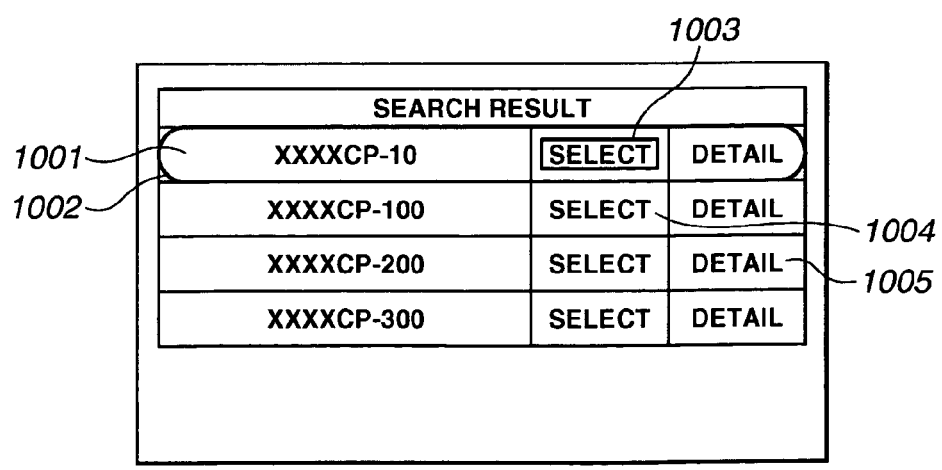
FIG. 9 shows an example of a data group held within the camera in which the digital camera connected to the LAN collects from the search responses returned by the equipment connected to the LAN.
FIG. 10 shows an example of a list display of the search result which the digital camera connected to the LAN makes on the equipment connected to the LAN.

In the present embodiment, the information as shown in FIG. 9, which will be described below, is obtained from the Printer_1 (105). After that, when connection is made wirelessly to the LAN, the information is used to make it easy to find out a target printer_1 (105) from among other LAN connected equipment.

Figure 6:
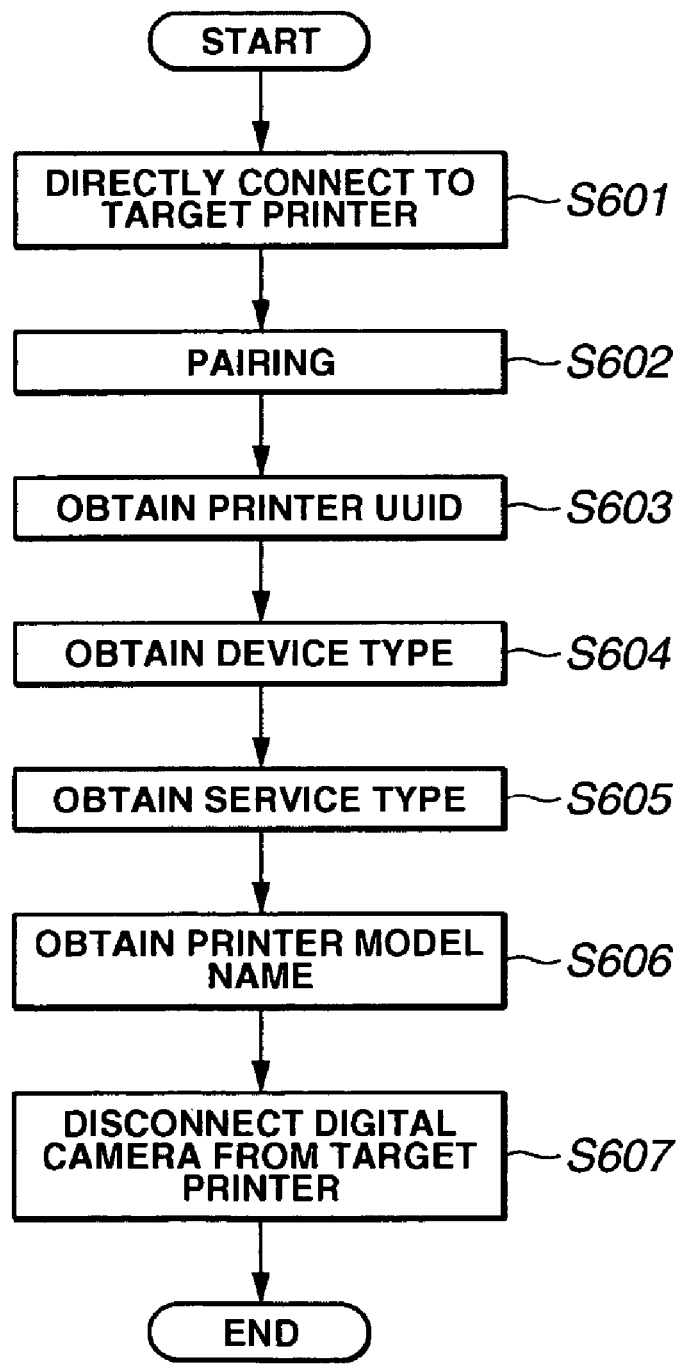
FIG. 6 is a flowchart showing the pairing processing between the digital camera and a target printer.

FIG. 6 is a flowchart showing processing in the digital camera 108 when the Printer_1 (105) in FIG. 1 and the digital camera 108 in FIG. 1 are connected by wire. The present processing is controlled and executed by a CPU (not shown) which controls the entire operation of the digital camera.

At step S601, a connection is made by wire to a target printer which outputs the image received from the digital camera 108 in FIG. 1. In the present embodiment, a target printer is the Printer_1 (105) in FIG. 1.

At step S602, pairing is started, which is a processing directed to acquiring information from the target printer. The pairing may be automatically started when the camera is connected by wire or after the camera is connected by wire, the pairing may be started by operating the UI member of the printer or the digital camera. In the present embodiment, the pairing is started by depressing a pairing start button (not shown) of the printer.

At step S603, the printer UUID is obtained. The UUID is a specific ID of the equipment, to which the identical one does not exist in the equipment connected to the LAN. By specifying this UUID, the connected equipment can be limited to only one equipment on the LAN.

At step S604, the device type of the printer is obtained. The device type is a type determined in advance, which represents the function of the equipment, such as printer/facsimile/scanner/PC. Some devices have a plurality of device types.

At step S605, the service type of the printer is obtained. The service type is a type determined in advance, which represents the function of the equipment, and defines a protocol and a data format when using the printer, such as a post script/LIPS/PictBridge. Some devices have a plurality of service types. PictBridge is a telecommunications standard for directly connecting the digital camera and the printer and printing. PictBridge was announced in 2003 by the Camera and Imaging Products Association (CIPA).

At step S606, the model name of the printer is obtained. It is possible that the equipment having the same model name is connected at the same time on the LAN.

The obtained UUID, device type, service type, and model name are held within the digital camera as a data group in which a captioned item name and its item are made a pair, as shown in FIG. 9.

At step S607, the digital camera and the target printer are disconnected. Thus, the pairing is completed, and preparation for connection to the LAN wirelessly has been made.

Figure 7:
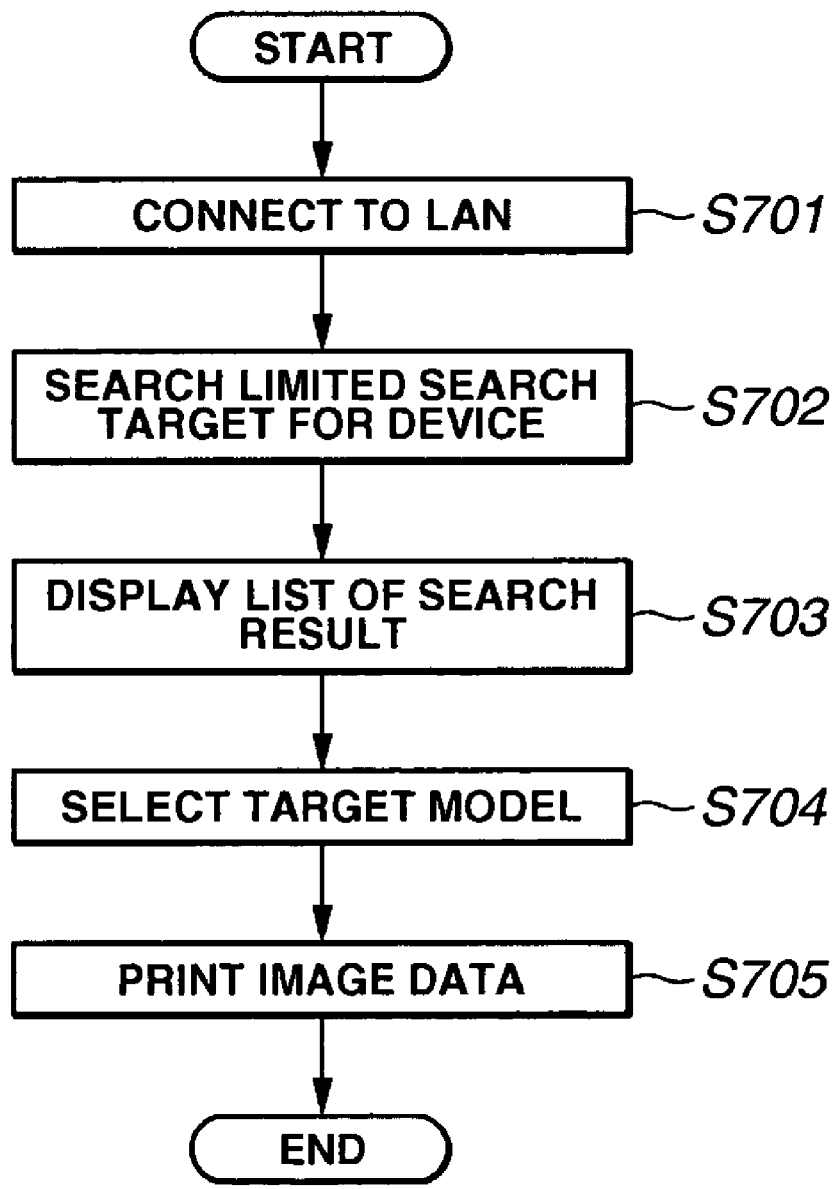
FIG. 7 is a flowchart showing the processing in which the digital camera is connected to the LAN and a search target is searched under a restrictive condition so as to perform printing.

FIG. 7 is a flowchart showing the processing in the digital camera when the digital camera is connected to the LAN and image data is printed in the target printer. The present processing is controlled and executed by a CPU (not shown) which controls the entire operation of the digital camera.

At step S701, the digital camera, subjected to the pairing processing in advance according to the above described procedure, is connected to the LAN wirelessly through the access point 109 in FIG. 1. A certification procedure may be required at this point in time depending on a security level of the LAN.

When the connection is completed, at step S702, an equipment discovery process to find out the target printer to output an image is executed. For the equipment discovery, a search request is broadcasted to all the equipment connected to the LAN. The equipment having received the search request returns a search response if the equipment matches search conditions.

The search request and the search response are shown in FIGS. 8A and 8B, and the search request is configured of the specifying of a search type and the parameter for performing a limited search by the search type. For example, in the device type 803 in FIG. 8A, a search by the device type is performed, and the device type to be searched is Printer. The device type 801 is a search type of ALL, and is used for searching all the equipment. Accordingly, there exists no parameter in this device.

The search response returned by the equipment having received the search request on the LAN is shown in the search response 806 in FIG. 8B. The equipment having received the search request checks the search type and parameter of the search request, and if it matches the conditions, returns the search response 806. The search response 806 includes information on the equipment which returns the response, and contains the UUID, the device type, the service type, and the model name. It is possible that there exist a plurality of items for a search type except the UUID.

The service process of step S702 in FIG. 7 performs the search as occasion demands by using the search request of FIG. 8A.

If it is desired that all the equipment connected to the LAN be listed, the search request 801 in FIG. 8A, which has no restrictive condition, is issued. Since the request has no restrictive condition in this case, the search responses are returned from all the equipment connected to the LAN.

In order to perform the search specifying the UUID, the search request 802 is issued. Since the UUID is unique on the LAN, the search response is returned from only one equipment.

In order to perform the search specifying the device type, the search request 803 is issued. When the device type is specified as a Printer, the search responses are returned from all the printers connected to the LAN.

In order to perform the search specifying the service type, the search request 804 is issued. When the service type is specified as a PictBridge, the search response is returned from the printer capable of printing by the PictBridge from among all the printers connected to the LAN.

In order to perform the search specifying the model name, the search request 805 is issued. When the model name is specified as XXXXCP-10, the search response is returned from the equipment, which model name is XXXXCP-10, from among the equipment connected to the LAN.

The digital camera holds all the search responses thus received as a data group as shown in FIG. 9.

At step S703, the digital camera displays a list of the search result as shown in FIG. 10. FIG. 10 is an example of the search result made by the service type, PictBridge.

Since only the printers capable of printing by the PictBridge are listed from among the equipment connected to the LAN, the selectable devices are narrowed down to be displayed, thereby making it easy to find out the target equipment. The list display in FIG. 10 is prepared from the equipment information data group in FIG. 9, and the model name 1001 is displayed as a captioned item name. Accordingly, the target equipment can be selected more easily. As the first exemplary embodiment, image data set to the equipment is received and displayed in the list of FIG. 10 so that the target equipment can be selected more easily.

In the list display, the main selection cursor 1002 is moved up and down using the upper and lower keys (not shown) of the digital camera, and the target equipment is selected from the list.

The subcursor key 1003 moves up and down in association with the main cursor 1002, and focuses onto a selection 1004 or a detail 1005 of the list item selected by the main cursor.

When the sub cursor 1003 is moved left and right using the left and right keys (not shown) of the digital camera, focused on the detail 1005 and a decision key (not shown) of the digital camera is depressed, the detailed information on the equipment selected by the main cursor 1002 can be displayed. The detailed information is the UUID, the device type, the service type, and the model name of the equipment in the information equipment data group shown in FIG. 9. As further assistance for specifying the target equipment, the detailed information can be displayed in the case where the target equipment is not specified by the model name alone.

At step S704, the main cursor key 1002 is focused onto the target equipment using the upper and lower keys of the digital camera. While the sub cursor is focused onto the selection 1004 using the left and right keys, when the decision key is depressed, the selected equipment is determined as the target printer.

While, in the above described example, the search has been made by the service type, when the search type of the search request is searched by ALL, a list of all the equipment on the LAN is displayed.

When the search type of the search request is searched by the UUID, only one equipment having the UUID is displayed from among all the equipment on the LAN. In the case where the equipment subjected to the pairing is determined as the target printer, if the search is made by the UUID, the procedure of selecting the equipment can be omitted, and the list display itself of step S703 in FIG. 7 can be omitted too.

When the search type of the search request is searched by the device type, only a list of the equipment having the specified device type is displayed from among all the equipment on the LAN. When the device type is searched as a Printer, only a list of printers on the LAN is displayed.

When the search type of the search request is searched by the model name, only a list of the equipment having the specified model name is displayed from among all the equipment on the LAN.

At step S704, when the target printer is determined, the image to be printed by the digital camera is selected, and at step S705, the print is performed.

Thus, when the digital camera is connected to the LAN, the pairing processing with the target printer is performed in advance and the obtained equipment information on the target printer is retained. The device search is executed using the obtained information and limiting the search target, so that a number of the equipment, which is listed in the connected equipment selection list, is limited, thereby making it easy to select the target equipment.

In the second embodiment, the digital camera is connected to the LAN wirelessly through the access point 109 of FIG. 1. However, even when the digital camera is connected to the LAN by the wire instead of the wireless access point, the same effect as the first embodiment can be obtained by connecting the digital camera by wire to the LAN after the pairing is performed with the target printer.

Other Embodiments

In the preceding embodiments, while the digital camera was described as an example, the present invention is not limited to the digital camera, but can be applied also to the equipment such as a PDA, a cellular phone, which are connectable to the network.

Further, while the printer was described as an example of the equipment for a connecting destination, the present invention is not limited to the printer, but can be applied also to other network equipment serving as the destination equipment such as a copying machine, a display device, or a storage device.

As described above, according to the above described configuration, since the data transmitted in advance to the printer from the camera is displayed together with a list of vast amounts of network equipment connected to the LAN or only the equipment matching the condition is listed and presented as an alternative. Accordingly, there is an advantage in that a trouble of specifying the target network equipment can be reduced.

Further, since the target equipment can be specified without inputting the equipment specific ID of the target network equipment, a trouble of checking the equipment specific ID is saved. Accordingly, there is an advantage of saving a trouble of inputting the equipment specific ID in the equipment hardly suitable for inputting operation such as the digital camera.

The present invention is not limited to the above described embodiments, and various modifications are possible within the scope as shown in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-295827 filed Oct. 8, 2004, which is hereby incorporated by reference herein in its entirety.

What is claimed is:

1. A control method for a digital camera connectable to a wireless network, comprising the following steps:
 a storing step of preliminarily storing printer identification information in correlation with a thumbnail image created from an image photographed by a digital camera;
 a wired communication step of transmitting the printer identification information to a printer and the thumbnail image stored in the storing step;
 a wireless communication step of communicating with a printer in a wireless network;
 a searching step of searching whether there is a printer which the camera can communicate with in a vicinity when the camera is connected to the wireless network and receiving the thumbnail image and the printer identification information from the printer by the wireless communication;
 a display step of displaying on a selection screen display unit a list of searched printers by using the thumbnail image and the printer identification information received in the receiving step; and
 a selecting step of selecting a printer to start communication with the selected printer as a communication partner.

* * * * *